United States Patent
Shin (10) Patent No.: US 12,365,355 B2
(45) Date of Patent: Jul. 22, 2025

(54) APPARATUS AND METHOD FOR PROVIDING IoT SERVICE BASED ON VEHICLE LOCATION

(71) Applicants: HYUNDAI MOTOR COMPANY, Seoul (KR); KIA CORPORATION, Seoul (KR)

(72) Inventor: Yong Woo Shin, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 361 days.

(21) Appl. No.: 17/857,744

(22) Filed: Jul. 5, 2022

(65) Prior Publication Data
US 2023/0019552 A1    Jan. 19, 2023

(30) Foreign Application Priority Data
Jul. 14, 2021 (KR) .................. 10-2021-0092204

(51) Int. Cl.
*B60W 50/12* (2012.01)
*H04W 4/021* (2018.01)

(52) U.S. Cl.
CPC ............ *B60W 50/12* (2013.01); *H04W 4/021* (2013.01); *B60W 2510/0666* (2013.01); *B60W 2554/4041* (2020.02)

(58) Field of Classification Search
CPC ... G06F 16/9535; H04L 67/26; H04W 64/006
See application file for complete search history.

(56) References Cited

U.S. PATENT DOCUMENTS

| | | | |
|---|---|---|---|
| 10,492,043 B1 | 11/2019 | Kim et al. | |
| 11,218,836 B1* | 1/2022 | Ilieva | H04W 4/021 |
| 2016/0225072 A1* | 8/2016 | Brady | G07C 5/008 |
| 2018/0060742 A1 | 3/2018 | Penilla et al. | |
| 2019/0048639 A1* | 2/2019 | Lickfelt | E05F 15/73 |
| 2019/0098448 A1* | 3/2019 | Jain | H04W 4/021 |
| 2020/0175867 A1 | 6/2020 | Chun et al. | |
| 2021/0095986 A1* | 4/2021 | Brown | G01C 21/3484 |
| 2021/0403054 A1 | 12/2021 | Kim | |

FOREIGN PATENT DOCUMENTS

| | | | |
|---|---|---|---|
| JP | 2020096331 A | 6/2020 | |
| KR | 20050088659 A | 9/2005 | |
| KR | 20090042494 A | 4/2009 | |
| KR | 20190102146 A | 9/2019 | |

* cited by examiner

*Primary Examiner* — Wade Miles
*Assistant Examiner* — Jerrod Irvin Davis
(74) *Attorney, Agent, or Firm* — Lempia Summerfield Katz LLC (57) ABSTRACT

A method and an apparatus for using a multi-boundary region to provide an Internet of Things (IoT) service according to an entrance and an exit of a preset boundary region based on a location of a vehicle, and an apparatus therefor. A method of controlling a location-based service includes determining a current location of a vehicle, and controlling reception of a notification information service. The notification information services is generated by at least one IoT device corresponding to a preset point in a plurality of states based on an ignition state and a relationship of the current location with respect to a first geo-fence set based on a distance from the preset point and a second geo-fence set based on an expected arrival time from the point. The second geo-fence may be set inside the first geo-fence.

17 Claims, 4 Drawing Sheets

APPARATUS AND METHOD FOR PROVIDING IoT SERVICE BASED ON VEHICLE LOCATION

CROSS-REFERENCE TO RELATED APPLICATION

This application claims the benefit of and priority to Korean Patent Application No. 10-2021-0092204, filed on Jul. 14, 2021, the entire contents of which are incorporated herein by reference.

BACKGROUND

Field of the Disclosure

The present disclosure relates to a method and an apparatus for using a multi-boundary region to provide an Internet of Things (IoT) service according to an entrance and an exit of a preset boundary region based on a location of a vehicle.

Description of the Related Art

The Internet of Things (IoT) refers to a physical network in which objects equipped with sensors and communication chips may automatically exchange real-time data without human intervention. In an IoT environment, devices (things) having built-in sensors or communication functions are connected to the Internet to be able to collect surrounding information, exchange this information with other devices, and make appropriate determinations.

In other words, the IoT refers to communication between objects, which perform wired and wireless networking based on sensors and chips attached to the IoT devices, and is further based on Bluetooth, near field communication (NFC), sensor data, networks, and the like.

In particular, the IoT has recently been in the spotlight since home electronic products may be operated using a smartphone outside a house. The IOT has also been actively combined with vehicles along with the concept of a smart car or a connected car.

As an example of such a combination, a service has been proposed in which a boundary centered at a specific point is set in advance, an IoT-related service is activated at the specific point when a vehicle enters the boundary from the outside, and the IoT-related service is deactivated at the specific point when the vehicle leaves the boundary. Such a service may be referred to as a welcome/goodbye service, which is described with reference to FIGS. 1A and 1B.

Figure 1A:
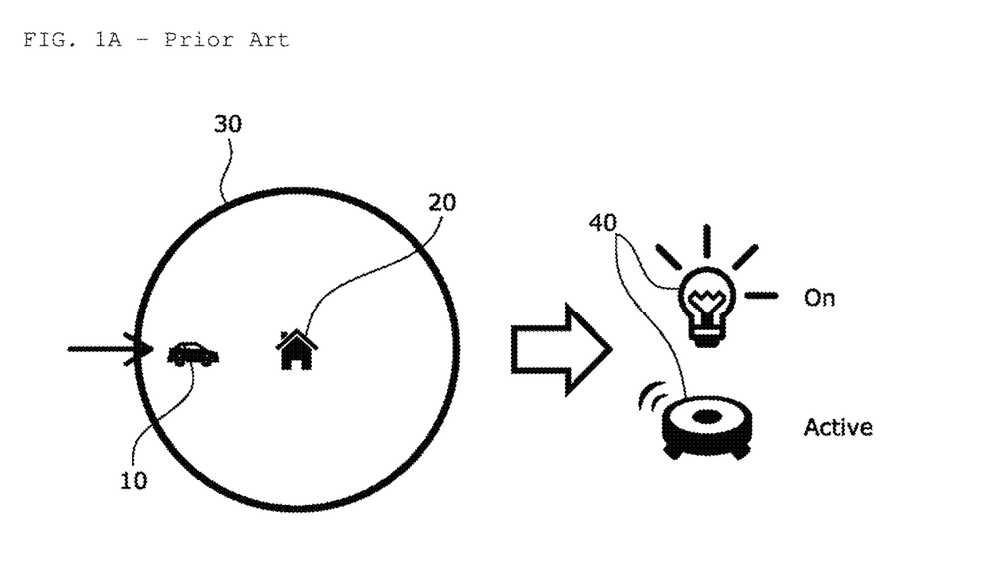
FIGS. 1A and 1B are diagrams describing the concept of a general welcome/goodbye service of the related art.
Figure 1B:
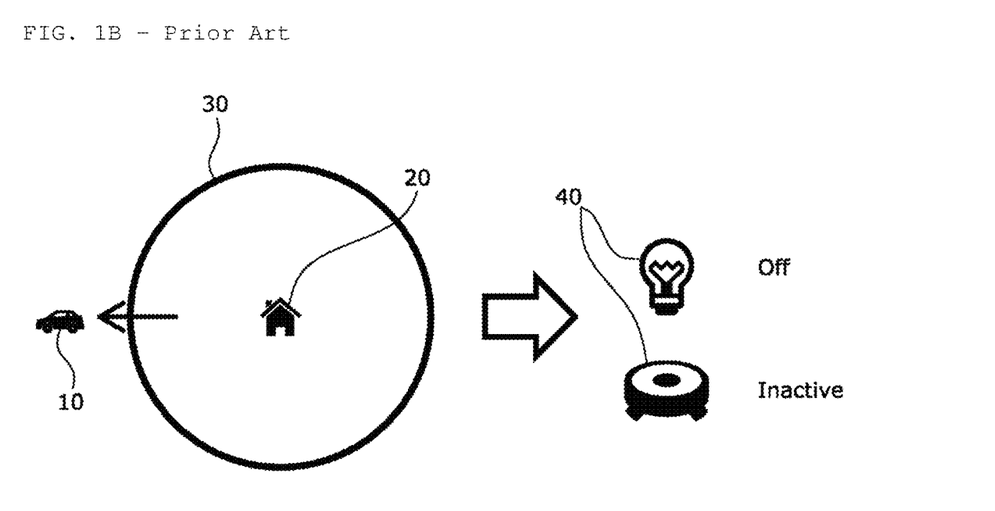

FIGS. 1A and 1B are diagrams of the related art describing the concept of a general welcome/goodbye service.

Referring to FIG. 1A, when a vehicle 10 enters the inside from outside a boundary 30 set along a radius of a certain distance from around the house 20, an IoT device 40 such as a light or a home appliance may be turned ON. Conversely, when the vehicle 10 leaves the boundary 30 as illustrated in FIG. 1B, the IoT device 40 may be turned OFF. When such a service is provided, functions desired in advance (e.g., a cooking function, an air conditioning/heating function, and the like) are activated when an occupant of the vehicle 10 returns home, and unnecessary functions are automatically deactivated when going out, which is significantly convenient.

In addition to the service for controlling an indoor IoT device, as described above with reference to FIGS. 1A and 1B, a service has been proposed in which information obtained from an indoor IoT device is provided through an output means. The output means is provided in the vehicle when the vehicle enters a boundary from outside the boundary. For example, notification of mail arriving at home, visitor history notification, apartment notice, and the like while a driver is away may be checked in the vehicle through this notification service while returning home.

However, when the above-described notification service is provided based on a boundary setting, it is desired to calculate the distance between Global Positioning System (GPS) information of the vehicle and GPS information of a user's house utilizing an IoT service provider. The following problems occur when the above-described notification service is provided based on a boundary setting.

For example, when the user's home is in a large-scale apartment complex, GPS information corresponding to a central point of the complex is referenced by the IoT service provider. In this case, where a boundary region is set to be small and the user's house is located outside the apartment complex, a problem occurs because a notification service may not be provided even when the user's vehicle actually arrives at the house. Conversely, where the boundary region is set to be relatively large in consideration of the large-scale apartment complex and when the user's house is a detached house, a problem arises that the notification service may be triggered first even though the distance to the house is not sufficiently close.

In addition, depending on the return route of the vehicle, the boundary may be repeatedly entered and exited. In this case, there is a problem in that a plurality of service triggers may occur within one driving cycle.

SUMMARY

Accordingly, the present disclosure is directed to an apparatus and method for providing an Internet of Things (IoT) service based on a vehicle location that substantially obviates one or more problems due to limitations and disadvantages of the related art.

An object of the present disclosure is to provide a method for more effectively providing a boundary-based service and an apparatus for performing the same.

Another object of the present disclosure is to provide a method for providing a boundary-based service that may prevent duplicate notifications or may prevent the failure of notifications according to a boundary and a return direction and may trigger a notification service at the most effective time, and an apparatus for performing the same.

Additional advantages, objects, and features of the present disclosure are set forth in part in the description which follows and in part should become apparent to those having ordinary skill in the art upon examination of the following or may be understood from the practice of the disclosure. The objects and other advantages of the present disclosure may be realized and attained by the structure particularly pointed out in the written description and claims hereof as well as the appended drawings.

To achieve these objects and other advantages, and in accordance with the purpose of the present disclosure, as embodied and broadly described herein, a method of controlling a location-based service includes determining a current location of a vehicle, and controlling reception of a notification information service. The notification information service is generated by at least one IoT device corresponding to a preset point in a plurality of states based on an ignition state. The notification information service is also generated by a relationship of the current location with respect to a first geo-fence set based on a distance from the preset point and a second geo-fence set based on an expected arrival time from the point. The second geo-fence is set inside the first geo-fence.

The first geo-fence may be set as a circle having a certain radius from the point, and the second geo-fence may be set by connecting sections having the same expected arrival time from the point.

If the current location is outside the first geo-fence, the controlling may include changing a state of the notification information service so that subscription to the notification information service is at an end.

The controlling may include requesting non-notification information from an IoT server configured to manage the at least one IoT device when the current location is between the first geo-fence and the second geo-fence, and an ignition is in an OFF state. The controlling may further include outputting the non-notification information through a predetermined output device when the non-notification information is received from the IoT server.

When the current location is between the first geo-fence and the second geo-fence, and the ignition is in an ON state, the controlling may further include changing a state of the notification information service so that subscription to the notification information service is at an end (e.g., finished).

The controlling may further include requesting a subscription to the notification information service from the IoT server when the current location is within the second geo-fence. The controlling may also include outputting notification information through the output device when the notification information is received from the IoT server.

The requesting the non-notification information may be performed through a first protocol based on request-response. The requesting the subscription to the notification information service may be performed through a second protocol based on a publish-subscribe.

The first protocol may include hypertext transfer protocol (HTTP), and the second protocol may include message queuing telemetry transport (MQTT) protocol.

The controlling may further include allowing accessory power to be turned OFF after the outputting ends.

In another aspect of the present disclosure, a location-based service apparatus a vehicle includes a communication unit and a controller. The controller is configured to determine a current location of a vehicle. The controller is further configured to control the reception of a notification information service generated by at least one IoT device corresponding to a preset point based on an ignition state and a relationship of the current location with respect to a first geo-fence set based on a distance from the preset point and a second geo-fence set based on an expected arrival time from the point. The location-based service apparatus for a vehicle further includes an output unit configured to output received notification information according to the notification information service when the notification information is received through the communication unit, according to the reception control of the controller. The second geo-fence is set inside the first geo-fence.

The first geo-fence may be set as a circle having a certain radius from the point, and the second geo-fence may be set by connecting sections having the same expected arrival time from the point.

If the current location is outside the first geo-fence, the controller may change a state of the notification information service so that subscription to the notification information service is at an end.

The controller may perform a control operation to request non-notification information from an IoT server configured to manage the at least one IoT device when the current location is between the first geo-fence and the second geo-fence, and an ignition is in an OFF state. The controller may also perform a control operation to output the non-notification information through a predetermined output device when the non-notification information is received from the IoT server.

When the current location is between the first geo-fence and the second geo-fence, and the ignition is in an ON state, the controller may change a state of the notification information service so that subscription to the notification information service is at an end.

When the current location is within the second geo-fence, the controller may request subscription to the notification information service from the IoT server.

The request for the non-notification information may be performed through a first protocol based on request-response. The subscription to the notification information service may be performed through a second protocol based on a publish-subscribe.

The first protocol may include HTTP, and the second protocol may include the MQTT protocol.

The controller may allow accessory power to be turned OFF after the output of the received non-notification information ends.

It is to be understood that both the foregoing general description and the following detailed description of the present disclosure are explanatory and are intended to provide further explanation of the disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and, together with the description, serve to explain the principle of the present disclosure. In the drawings.

DETAILED DESCRIPTION

Hereinafter, embodiments of the present disclosure are described in detail with reference to the accompanying drawings, and the same or similar elements are given the same reference symbols regardless of reference symbols. Further, redundant descriptions thereof are omitted. In the following description, the terms "module" and "unit" for referring to elements are assigned and used interchangeably in consideration of the convenience of explanation, and thus, the terms per se do not necessarily have different meanings or functions. Further, in describing the embodiments disclosed in the present specification, when it is determined that a detailed description of a related publicly known technology may obscure the gist of the embodiments disclosed in the present specification, the detailed description thereof is omitted. The accompanying drawings are used to help easily explain various technical features, and it should be understood that the embodiments presented herein are not limited by the accompanying drawings. As such, the present disclosure should be construed to extend to any alterations, equivalents, and substitutes in addition to those which are particularly set out in the accompanying drawings.

Although terms including ordinal numbers "first," "second," and the like may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements in the middle.

The singular expression includes the plural expression unless the context clearly dictates otherwise.

In the present specification, it should be understood that a term such as "include" or "have" is intended to designate that the features, numbers, steps, operations, elements, parts, combinations thereof described in the specification are present. Further, it should be understood that a term such as "include" or "have" does not preclude the possibility of the addition or presence of one or more other features, numbers, steps, operations, elements, parts, or combinations thereof.

When a component, device, element, or the like of the present disclosure is described as having a purpose or performing an operation, function, or the like, the component, device, or element should be considered herein as being "configured to" meet that purpose or to perform that operation or function.

In the embodiments of the present disclosure, it is proposed to provide an effective Internet of Things (IoT)-based notification service by setting multiple boundaries and defining an operation state for each boundary.

First, the concept of multiple geo-fences and an operation state for each geo-fence according to an embodiment is described with reference to FIG. 2.

Figure 2:
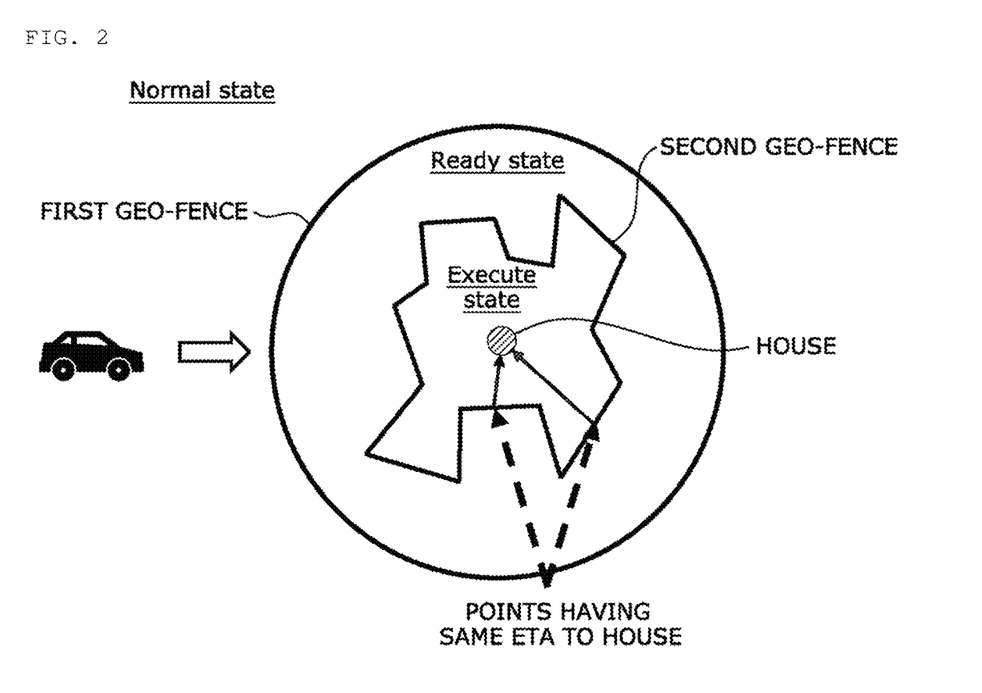
FIG. 2 is a diagram describing multiple geo-fences and an operation state for each geo-fence applicable to embodiments of the present disclosure.

FIG. 2 is a diagram describing multiple geo-fences and an operation state for each geo-fence applicable to embodiments of the present disclosure.

Referring to FIG. 2, two different geo-fences may be set around a house registered in a home IoT service of a user. In this example, as GPS information of the house, it is possible to use a GPS value of a building registered as the house based on account information of the user by a home IoT service provider.

Based on the GPS of the house, a first geo-fence may be set as a circle having a preset radius. The preset radius may be advantageous when set in a range (for example, 2 km) large enough to cover even a large-scale apartment complex. However, the present disclosure is not limited thereto.

A second geo-fence may be set by connecting sections having the same estimated time arrival (ETA) equal to or less than a predetermined time (for example, 3 to 5 minutes) to the house through vehicle operation. Accordingly, the second geo-fence may be set as a fixed type based on an average ETA of a predetermined time section, or may be periodically updated or dynamically set by reflecting real-time traffic conditions.

In summary, the first geo-fence may be set based on an absolute distance based on the GPS of the building registered as the house, and the second geo-fence may be set as a set of points having the same ETA to the house. However, it is advantageous that the first geo-fence has a size that may include at least the entire second geo-fence. In other words, the entire second geo-fence is advantageously located inside the first geo-fence.

In addition, in the embodiment of the present disclosure, service states may be determined according to current locations of a vehicle with respect to the geo-fences. First, a service state may become a normal state outside the first geo-fence, become a ready state between the first geo-fence and the second geo-fence, and become an execution state within the second geo-fence. The meaning of each state is as follows.

The normal state is an IoT service state at a location other than that around the house. The Normal state may refer to a subscription cancellation/termination state in which information collected by an IoT device in the house is not basically acquired.

The ready state is an IoT service state according to the arrival of the vehicle near the house. Whether to subscribe to notification information may be determined according to whether the vehicle is driven (e.g., ignition ON/OFF and the like).

The execution state is a state that triggers the IoT service, and notification information may be provided to a user in the vehicle by starting a notification information subscription.

Figure 3:
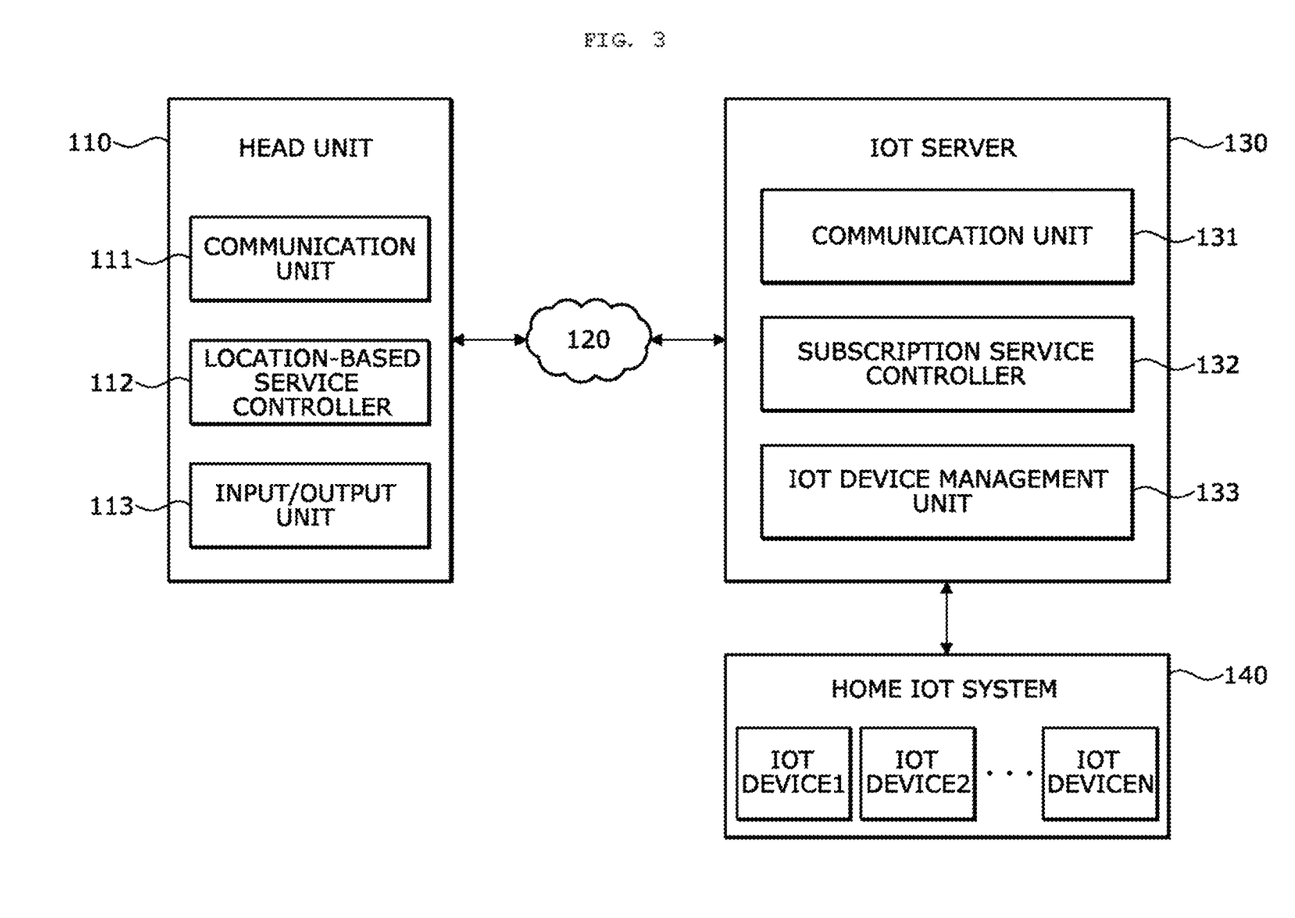
FIG. 3 illustrates an example of a configuration of a boundary-based service provision system according to an embodiment of the present disclosure.

Next, a system configuration applicable to the embodiments is described. FIG. 3 illustrates an example of a configuration of a boundary-based service provision system according to an embodiment of the present disclosure.

Referring to FIG. 3, the boundary-based service provision system, according to an embodiment, may include a head unit 110 of the vehicle, a wireless communication network 120, an IoT server 130, and a home IoT system 140.

The head unit 110 may include a communication unit 111, a location-based service controller 112, and an input/output unit 113.

The communication unit 111 may perform an internal communication function of communicating with an internal device (e.g., another controller, a sensor, and the like) of the vehicle and an external communication function of communicating with an external entity such as the IoT server 130. For example, when a GPS module is provided separately from the head unit 110, the communication unit 111 may acquire GPS information corresponding to a current location through the internal communication function. The communication unit 111 may also acquire a state of the vehicle (e.g., ignition ON/OFF and the like). However, the present disclosure is not limited thereto. For the internal communication function, the communication unit 111 may include a transceiver corresponding to at least one of vehicle communication protocols such as controller area network (CAN), flexible data rate (CAN-FD), local interconnect network (LIN), and Ethernet. In addition, for the external communication function, the communication unit 111 may include a modem corresponding to at least one wireless communication protocol such as $3^{rd}$ Generation Partnership Project (3GPP)-based (3G/LTE/5G and the like) or Global System Mobile Communications (GSM). In communication with the IoT server 130, the communication unit 111 may exchange data with a communication unit 131 of the IoT server 130 through the wireless communication network 120. In this case, a telematics service server (not illustrated) may relay communication between the communication units 111 and 131 on both sides. In particular, in performing communication with the communication unit 131 of the IoT server 130, the communication unit 111 may perform communication according to a request-response-based protocol, for example, hypertext transfer protocol (HTTP), and may perform communication according to a publish-subscribe-based protocol, for example, message queuing telemetry transport (MQTT) protocol.

The location-based service controller 112 may control the service state for IoT notification as any one of the above-described normal, ready, and execution states based on the current location of the vehicle for each geo-fence included in the multiple geo-fences. According to implementation, the location-based service controller 112 may dynamically manage the second geo-fence based on real-time traffic information.

The input/output unit 113 includes an input means (e.g., a key button, a dial, a microphone, a touch sensing device, and the like) for receiving a command from the user, and an output means (e.g., a display, a speaker, and the like) for outputting at least IoT notification information. Accordingly, when the location-based service controller 112 determines output of an IoT notification service in consideration of the current location and a vehicle state, the IoT notification information obtained through the communication unit 111 may be output in a predetermined form (e.g., text display and the like) through the output means of the input/output unit 113.

For example, the head unit 110 may be implemented in the form of an audio/video/navigation (AVN) system. However, the present disclosure is not limited thereto, and the external communication function of the communication unit 211 may be implemented as a separate controller such as a telematics unit (TMU).

In addition, the head unit 110 may be implemented as at least one processor, memory, and transceiver/modem. In this case, it should be apparent that the location-based service controller 112 may be implemented in the form of storing a set or instructions executed through the processor in the memory to perform the above-described function.

The IoT server 130 may include the communication unit 131, a subscription service controller 132, and an IoT device management unit 133.

The communication unit 131 may exchange data with the communication unit 111 of the head unit 110 and at least one IoT device included in the home IoT system 140.

When subscription to notification information is started in the head unit 110 according to a publish-subscribe-based protocol (e.g., MQTT protocol), the subscription service controller 132 may issue a non-alarm item or a new registration alarm to the head unit 110. In this example, the non-alarm item may refer to an item not transmitted to the head unit 110 when a previous subscription is requested (e.g., notification information generated after termination of a previous subscription and the like) in notification information acquired by the IoT device management unit 133 from IoT devices of the home IoT system 140 through the communication unit 131. In addition, even when there is a non-notification item request in a form other than MQTT protocol (e.g., an HTTP-based request) from the head unit 110, the subscription service controller 132 may transmit a non-notification item to the head unit 110 through the communication unit 131.

The IoT device management unit 133 may receive notification information from at least one IoT device included in the home IoT system 140 through the communication unit 131, and notify the subscription service controller 132 of the notification information. Reception of notification information may be performed periodically, may be performed based on a trigger when there is subscription request from the head unit 110, or may be performed according to real-time transmission of the IoT device. However, the present disclosure is not limited thereto.

The home IoT system 140 may include at least one IoT device, and depending on implementation, may further include a hub device (not illustrated) that manages at least one IoT device. Further, any one of the IoT devices may serve as a hub. Each of the at least one IoT device may provide information acquired by each IoT device to the IoT server 130 to implement the embodiment, and may change an operation state according to mode control of the IoT server 130 or a control command for a specific device. Examples of the IoT device may include a lighting device, an air conditioning/heating device, a cooking device, a vacuum cleaner, various opening/closing devices, and a sensor. However, the present disclosure is not limited thereto.

Figure 4:
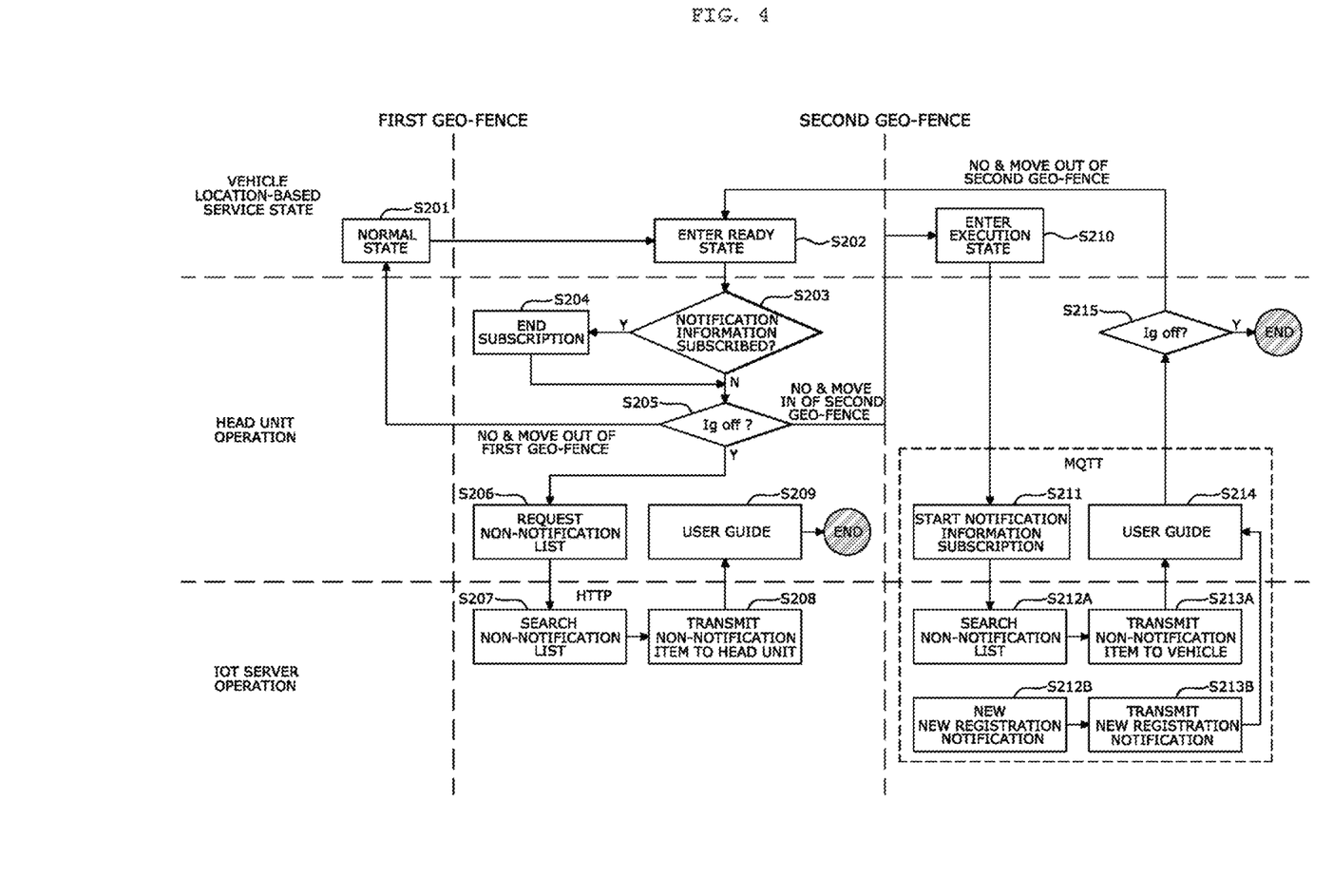
FIG. 4 illustrates an example of a boundary-based service provision process according to an embodiment of the present disclosure.

Based on the configuration of the multiple geo-fences and the configuration of the location-based service provision system described above, a service provision process according to an embodiment is described below with reference to FIG. 4. FIG. 4 illustrates an example of a boundary-based service provision process according to an embodiment of the present disclosure.

In FIG. 4, it is assumed that the head unit 110 of the vehicle already retains the GPS information of the house registered in the home IoT notification service and information about the first geo-fence and the second geo-fence. Control is started in a situation where the vehicle is located outside the first geo-fence.

Referring to FIG. 4, the head unit 110 of the vehicle determines the current location of the vehicle based on the GPS information. Since the current location is outside the first geo-fence, the service state becomes the normal state (S201). As described above, the notification service is not activated in the normal state.

If the vehicle crosses the first geo-fence and enters between the first geo-fence and the second geo-fence, the service state is changed to the ready state (S202). The head unit 110 verifies whether the notification information is already subscribed (S203), and ends the subscription when the notification information is subscribed (S204).

When the notification information is not subscribed or the subscription is terminated, the head unit 110 checks an ignition state (Ig) of the vehicle (S205). When the vehicle moves out of the first geo-fence in a state in which the ignition is not turned OFF, the service state is changed back to the normal state (S201).

When the ignition is not turned OFF between the first geo-fence and the second geo-fence (i.e., in the ready state) (Yes in S205), the head unit 110 requests a non-notification list from the IoT server 130 (S206). In this instance, the request for the non-notification list may be performed using an HTTP scheme. The IoT server 130 may search the non-notification list (S207), and when a non-notification item is present, the IoT server 130 may transmit the non-notification item to the head unit 110 (S208). Accordingly, the head unit 110 may output notification information in a predetermined form to the user through the output means of the input/output unit 113 (S209). In this example, the head unit 110 may allow switching of a key box state of the vehicle to an accessory power OFF (ACC OFF) state only after outputting the notification information.

When the vehicle enters the second geo-fence in a state in which the ignition is not turned OFF upon checking the ignition state (S205), the head unit 110 may change the service state to the execution state (S210).

Accordingly, the head unit 110 may start notification information subscription according to MQTT protocol (S211). The IoT server 130 may search the non-notification list (S212A), and when a non-notification item is present, the IoT server 130 may transmit (i.e., issue) the non-notification item to the head unit 110 (S213A). Additionally, the IoT server 130 may check a new registration notification (S212B), and when the new registration notification is present, the IoT server 130 may transmit the new registration notification to the head unit 110 (S21313).

Accordingly, the head unit 110 may output the notification information to the user in a predetermined form through the output means of the input/output unit 113 (S214).

In addition, the head unit 110 checks the ignition state of the vehicle (S215), and when the ignition is turned OFF upon arrival at a destination, for example, (Yes in S215), location-based notification service control according to the embodiment may be terminated. On the contrary, when the vehicle moves out of the second geo-fence in a state in which the ignition is not turned OFF, the head unit 110 may change the service state to the ready state again (S202). In other words, the state of being subscribed to the notification information in step (S203) may correspond to the case in which the notification information subscription is started in step (S211) and then step (S215) is transferred to step (S202).

In the above description, the head unit 110 of the vehicle requests the non-notification list from the IoT server or starts notification information subscription according to a relative positional relationship with the geo-fences. However, according to another embodiment, an entity outside the vehicle may be implemented to perform the above-described operation. For example, when the telematics service server detects movement between geo-fences while monitoring the vehicle location, the telematics service server may request the non-notification list from the IoT server according to the location of the moved vehicle. Furthermore, the telematics service server may also transmit the non-notification list to the head unit 110 of the vehicle, or start notification information subscription and transmit information issued by the IoT server to the head unit 110.

The present disclosure described above may be implemented as computer-readable code on a medium in which a program is recorded. The computer-readable medium includes all types of recording devices in which data readable by a computer system is stored. Examples of the computer-readable medium include a hard disk drive (HDD), a solid state drive (SSD), a silicon disk drive (SDD), a read-only memory (ROM), a random-access memory (RAM), a compact disc read-only memory (CD-ROM), a magnetic tape, a floppy disk, an optical data storage device, and the like. In addition, the computer may include the vehicle determination unit 220.

According to the various embodiments of the present disclosure described above, a more effective boundary-based service may be provided.

In particular, according to the present disclosure, duplicate notifications or notification failure may be prevented by setting a plurality of different regions. Furthermore, the notification may be provided at a point having a constant expected arrival time regardless of a return route.

The effects obtainable in the present disclosure are not limited to the above-mentioned effects, and other effects not mentioned herein may be clearly understood by those having ordinary skill in the art to which the present disclosure belongs from the above description.

It should be apparent to those having ordinary skill in the art that various modifications and variations may be made in the present disclosure without departing from the spirit or scope of the present disclosure. Thus, it is intended that the present disclosure covers the modifications and variations of this disclosure provided they come within the scope of the appended claims and their equivalents.

What is claimed is:

1. A method of controlling a location-based service, the method comprising:
   determining a current location of a vehicle; and
   controlling reception of a notification information service generated by at least one Internet of Things (IOT) device corresponding to a preset point in a plurality of states based on an ignition state and a relationship of the current location with respect to a first geo-fence set based on a distance from the preset point with a fixed location and a second geo-fence set based on an expected arrival time from the point,
   wherein the second geo-fence is set as a fixed type based on an average estimated time arrival of a predetermined time section or set by reflecting real time traffic conditions,
   wherein the second geo-fence is set inside the first geo-fence, and
   wherein the controlling includes:
      requesting non-notification information from an IoT server configured to manage the at least one IoT device when the current location is between the first geo-fence and the second geo-fence, and an ignition is in an OFF state; and
      outputting the non-notification information through a predetermined output device when the non-notification information is received from the IoT server.

2. The method according to claim 1, wherein:
   the first geo-fence is set as a circle having a certain radius from the point; and
   the second geo-fence is set by connecting sections having a same expected arrival time from the point.

3. The method according to claim 1, wherein, if the current location is outside the first geo-fence, the controlling includes changing a state of the notification information service so that subscription to the notification information service is at an end.

4. The method according to claim 1, wherein, when the current location is between the first geo-fence and the second geo-fence, and the ignition is in an ON state, the controlling further includes changing a state of the notification information service so that subscription to the notification information service is at an end.

5. The method according to claim 4, wherein the controlling further includes:
   requesting subscription to the notification information service from the IoT server when the current location is within the second geo-fence; and
   outputting notification information through the output device when the notification information is received from the IoT server.

6. The method according to claim 5, wherein:
   the requesting the non-notification information is performed through a first protocol based on request-response; and the requesting the subscription to the notification information service is performed through a second protocol based on publish-subscribe.

7. The method according to claim 6, wherein:
the first protocol includes hypertext transfer protocol; and
the second protocol includes a message queuing telemetry transport protocol.

8. The method according to claim 1, wherein the controlling further includes allowing accessory power to be turned OFF after the outputting ends.

9. A computer-readable recording medium recording a program for executing the method according to claim 1.

10. A location-based service apparatus for a vehicle, the apparatus comprising:
a communication unit;
a controller configured to determine a current location of a vehicle and control reception of a notification information service generated by at least one Internet of Things (IOT) device corresponding to a preset point based on an ignition state and a relationship of the current location with respect to a first geo-fence set based on a distance from the preset point with a fixed location and a second geo-fence set based on an expected arrival time from the point; and
an output unit configured to output received notification information according to the notification information service when the notification information is received through the communication unit according to the reception control of the controller,
wherein the second geo-fence is set as a fixed type based on an average estimated time of arrival (ETA) of a predetermined time section or set by reflecting real-time traffic conditions,
wherein the second geo-fence is set inside the first geo-fence, and
wherein the controller performs a control operation to request non-notification information from an IoT server configured to manage the at least one IoT device when the current location is between the first geo-fence and the second geo-fence, and an ignition is in an OFF state, and output the non-notification information through a predetermined output device when the non-notification information is received from the IoT server.

11. The location-based service apparatus according to claim 10, wherein:
the first geo-fence is set as a circle having a certain radius from the point; and
the second geo-fence is set by connecting sections having the same expected arrival time from the point.

12. The location-based service apparatus according to claim 10, wherein, if the current location is outside the first geo-fence, the controller changes a state of the notification information service so that subscription to the notification information service is at an end.

13. The location-based service apparatus according to claim 10, wherein, when the current location is between the first geo-fence and the second geo-fence, and the ignition is in an ON state, the controller changes a state of the notification information service so that subscription to the notification information service is at an end.

14. The location-based service apparatus according to claim 13, wherein, when the current location is within the second geo-fence, the controller requests subscription to the notification information service from the IoT server.

15. The location-based service apparatus according to claim 14, wherein:
the request for the non-notification information is performed through a first protocol based on request-response; and
the subscription to the notification information service is performed through a second protocol based on publish-subscribe.

16. The location-based service apparatus according to claim 15, wherein:
the first protocol includes hypertext transfer protocol; and
the second protocol includes a message queuing telemetry transport protocol.

17. The location-based service apparatus according to claim 10, wherein the controller allows accessory power to be turned OFF after the output of the received non-notification information ends.

* * * * *